(12) United States Patent
Yuan et al.

(10) Patent No.: US 8,515,167 B2
(45) Date of Patent: Aug. 20, 2013

(54) HIGH DYNAMIC RANGE IMAGE MAPPING WITH EMPIRICAL MODE DECOMPOSITION

(75) Inventors: Xiaoru Yuan, Beijing (CN); Peihong Guo, Beijing (CN)

(73) Assignee: Peking University, Beijing (CN)

( * ) Notice: Subject to any disclaimer, the term of this patent is extended or adjusted under 35 U.S.C. 154(b) by 411 days.

(21) Appl. No.: 12/551,093

(22) Filed: Aug. 31, 2009

(65) Prior Publication Data

US 2011/0052088 A1 Mar. 3, 2011

(51) Int. Cl.
*G06K 9/36* (2006.01)

(52) U.S. Cl.
USPC .......................... 382/166; 382/275; 382/302

(58) Field of Classification Search
USPC .......... 348/143; 353/31; 381/119; 382/131, 382/162, 232, 240, 294, 165, 167, 238, 251, 382/260, 274, 106, 124, 132; 396/155; 702/75, 702/190, 194; 345/660, 698
See application file for complete search history.

(56) References Cited

U.S. PATENT DOCUMENTS

| | | | |
|---|---|---|---|
| 5,835,618 A * | 11/1998 | Fang et al. | 382/132 |
| 5,983,162 A | 11/1999 | Huang | |
| 6,311,130 B1 | 10/2001 | Huang | |
| 6,381,559 B1 | 4/2002 | Huang | |
| 6,507,798 B1 * | 1/2003 | Salvino et al. | 702/75 |
| 6,618,503 B2 * | 9/2003 | Hel-or et al. | 382/167 |
| 6,631,325 B1 | 10/2003 | Huang et al. | |
| 6,717,698 B1 * | 4/2004 | Lee | 358/1.9 |
| 6,738,734 B1 | 5/2004 | Huang | |
| 6,788,792 B1 * | 9/2004 | Maejima et al. | 381/106 |
| 6,862,558 B2 * | 3/2005 | Huang | 702/194 |
| 6,901,353 B1 | 5/2005 | Huang | |
| 6,987,890 B2 * | 1/2006 | Joshi et al. | 382/240 |
| 6,990,436 B1 | 1/2006 | Huang | |
| 7,146,059 B1 * | 12/2006 | Durand et al. | 382/260 |
| 7,415,169 B2 * | 8/2008 | Florent et al. | 382/294 |
| 7,454,136 B2 * | 11/2008 | Raskar et al. | 396/155 |
| 7,464,006 B1 * | 12/2008 | Huang | 702/190 |
| 7,826,673 B2 * | 11/2010 | Segall | 382/238 |
| 7,932,914 B1 * | 4/2011 | Geiss et al. | 345/660 |
| 8,036,473 B1 * | 10/2011 | Ratto et al. | 382/232 |
| 8,217,970 B2 * | 7/2012 | Whitehead et al. | 345/698 |
| 8,290,295 B2 * | 10/2012 | Criminisi et al. | 382/274 |
| 2004/0138558 A1 | 7/2004 | Dunki-Jacobs et al. | |
| 2007/0076971 A1 * | 4/2007 | Roimela et al. | 382/251 |
| 2007/0258618 A1 | 11/2007 | Shi et al. | |
| 2008/0025580 A1 * | 1/2008 | Sidlauskas et al. | 382/124 |
| 2008/0175415 A1 * | 7/2008 | Kunimoto | 381/119 |
| 2009/0033875 A1 * | 2/2009 | King et al. | 353/31 |
| 2009/0278928 A1 * | 11/2009 | McCloskey | 348/143 |
| 2010/0074496 A1 * | 3/2010 | Pao et al. | 382/131 |
| 2010/0195901 A1 * | 8/2010 | Andrus et al. | 382/162 |
| 2010/0303349 A1 * | 12/2010 | Bechtel et al. | 382/165 |

OTHER PUBLICATIONS

Yuanzhen Li, Lavanya Sharan, Edward H. Adelson, "Compressing and Companding High Dynamic Range Images with Subband Architectures," ACM Transactions on Graphics (TOG), 24(3), Proceedings of SIGGRAPH 2005.*

(Continued)

*Primary Examiner* — Vu Le
*Assistant Examiner* — Xuemei Chen
(74) *Attorney, Agent, or Firm* — Brundidge & Stanger, P.C.

(57) ABSTRACT

The disclosure relates generally to receiving original image data, decomposing the original image data into layers, compressing a dynamic range of each of layers, and integrating compressed layers to form a final image.

20 Claims, 5 Drawing Sheets

(56) References Cited

OTHER PUBLICATIONS

Harishwaran Hariharan et al., "Image Fusion and Enhancement via Empirical Mode Decomposition," Journal of Pattern Recognition Research 1, pp. 16-31, 2006.*

G. Xu et al, "Neighborhood Limited Empirical Mode Decomposition and Application in Image Processing", Fourth International Conference on Image and Graphics, p. 149-154, 2007 IEEE.

"Analyze nonlinear, nonstationary signals with Hilbert-Huang Transform," accessed from http://web.archive.org/web/20090117175613/http://techtransfer.gsfc.nasa.gov/HHT/ accessed on May 5, 2012.

Debevec, P. E., and Malik, J., "Recovering High Dynamic Range Radiance Maps from Photographs," ACM SIGGRAPH, 1997, vol. 31, Issue: 1, pp. 369-378.

Durand, F., and Dorsey, J., "Fast Bilateral Filtering for the Display of High-Dynamic-Range Images," ACM SIGGRAPH, 2002, vol. 21, Issue: 3, pp. 257-266.

Fattal, R., "Gradient Domain High Dynamic Range Compression," ACM SIGGRAPH, 2002, vol. 21, Issue: 3, pp. 249-256.

Reinhard, E., "Photographic Tone Reproduction for Digital Images," ACM SIGGRAPH, 2002, vol. 21, Issue: 3, pp. 267-276.

Seetzen, H., "High Dynamic Range Display Systems," ACM SIGGRAPH, 2004, vol. 23, Issue: 3, pp. 760-768.

* cited by examiner

HIGH DYNAMIC RANGE IMAGE MAPPING WITH EMPIRICAL MODE DECOMPOSITION

BACKGROUND

High dynamic range images have a greater dynamic range of luminance between light and dark areas of a scene than normal images. This permits more accurate representation of the wide range of intensity levels found in real scenes ranging from direct sunlight to shadows. However, high dynamic range images may not be directly viewed on an average display device due to limitations of the display device.

SUMMARY

A method, and alternatively, a computer-readable medium storing a set of instructions, executed by a processor to perform the method, is described for receiving original image data; decomposing the original image data into a plurality of layers; compressing a dynamic range of each of the plurality of layers; and integrating the plurality of compressed layers to form a final image.

In this method, each of the plurality of layers may encode information of different frequency ranges of intensity.

In this method, compressing the dynamic range may include compressing the intensity dynamic range of each of the plurality of layers.

In this method, compressing the dynamic range may further include determining a dynamic range of a display device; and compressing the dynamic range of each of the plurality of layers wherein the final image has a dynamic range within the dynamic range of the display device.

In this method, the original image may be decomposed by a Hilbert Huang Transform.

In this method at least one of the pluralities of layers may be compressed with a different compression ratio than another of the plurality of layers.

In this method, the original image data is decomposed into a plurality of layers by decomposing a signal representing the original image into basis functions that are adapted from the signal itself In this method, at least one of the plurality of layers having a large intensity amplitude is compressed by a large compression ratio.

In this method, at least one of the plurality of layers having a small intensity amplitude is compressed by a small compression ratio.

Furthermore, the present disclosure describes an apparatus for high dynamic range mapping of image data. The apparatus includes a receiver configured to receive original image data; a decomposition unit configured to decompose the original image data into a plurality of layers by decomposing a signal representing the original image into basis functions that are adapted from the signal itself; a compression unit configured to compress a dynamic range of each of the plurality of layers; and an integrating unit configured to integrate the plurality of compressed layers to form a final image.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the features of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, computer programs stored on computer-readable mediums and systems related to high dynamic range image mapping for a high dynamic range image. Particularly, high dynamic range mapping for a high dynamic range image by using empirical mode decomposition (EMD), for example, Hilbert-Huang Transform (HHT). By providing for high dynamic range mapping for a high dynamic range by using EMD such as HTT (EMD/HTT), the dynamic range image may be viewable on a display while maintaining image details.

For example, original image data may be obtained and decomposed into a plurality of layers. The decomposition may be performed by EMD, such as HTT. Each of the plurality of layers may be compressed using a compression algorithm. Different compression algorithms may be performed on different layers. Alternatively, the same compression algorithm may be performed on more than one different layer. The compressed layers are integrated into a final image. The dynamic range of the final image may be less than the dynamic range of the original image, thereby permitting the final image to be displayed on an average display.

The use of the term "image" in this disclosure is not intended be limited to a particular file type or data format. Instead, the term "image" as used in this disclosure may encompass content from any image file type or data format (JPEG, BMP, etc.), any graphically rendered document (e.g., a webpage or HTML document), a computer-aided design (CAD) application, scanned photographs or documents (e.g., in PDF format), or any other type of computer-generated image.

Figure 1:
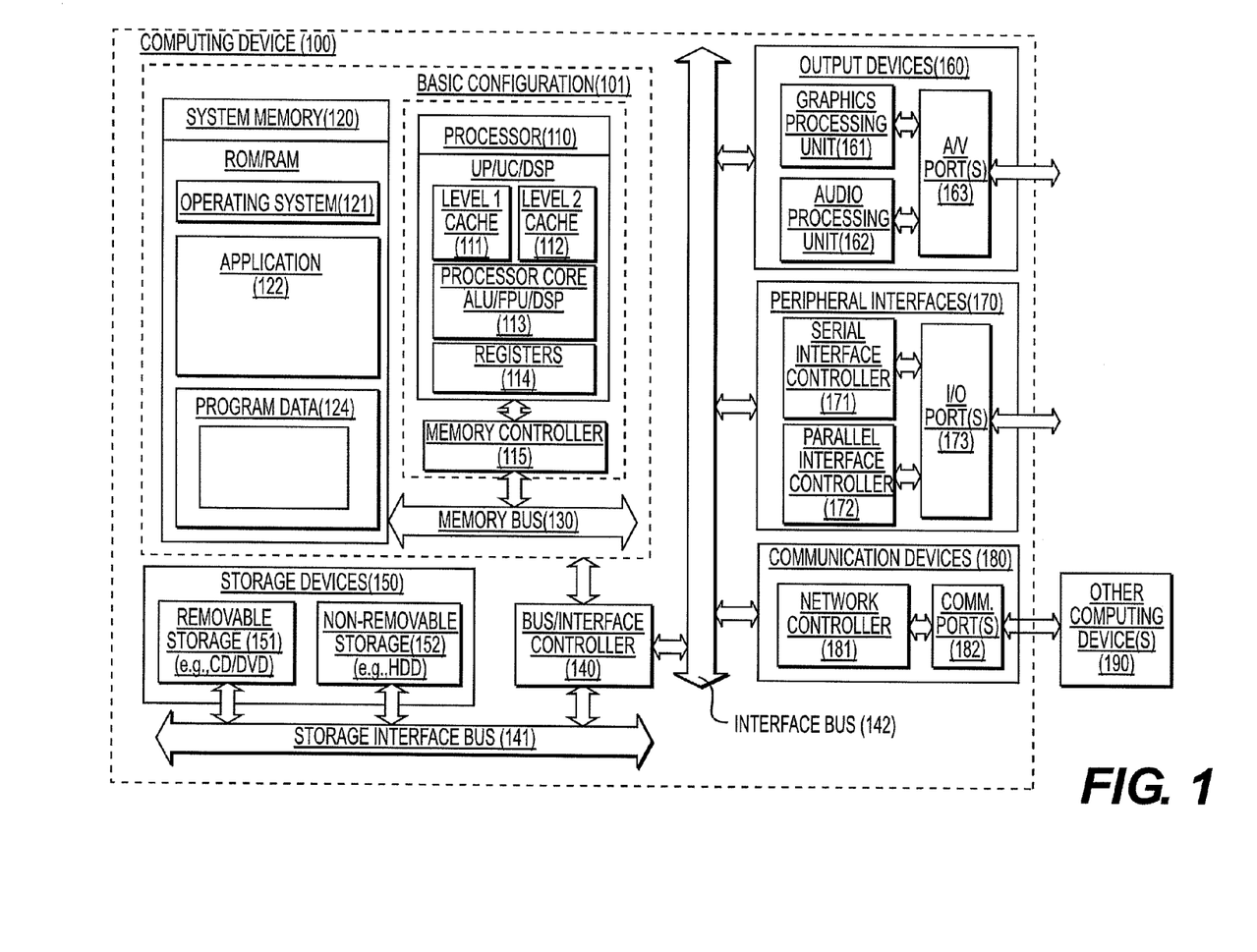
FIG. 1 is a block diagram illustrating an example of a configuration of a computing device arranged to process images, according to an example embodiment.

FIG. 1 is a diagram illustrating a system environment in which the features disclosed herein may be implemented. In a very basic configuration 101, computing device 120 typically includes one or more processors 110 and system memory 120. A memory bus 130 can be used for communicating between the processor 110 and the system memory 120.

Depending on the desired configuration, processor 110 can be of any type including but not limited to a microprocessor (µP), a microcontroller (µC), a digital signal processor (DSP), or any combination thereof. Processor 110 can include one more levels of caching, such as a level one cache 111 and a level two cache 112, a processor core 113, and registers 114. The processor core 113 can include an arithmetic logic unit (ALU), a floating point unit (FPU), a digital signal processing core (DSP Core), or any combination thereof. A memory controller 115 can also be used with the processor 110, or in some implementations the memory controller 115 can be an internal part of the processor 110.

Depending on the desired configuration, the system memory 120 can be of any type including but not limited to volatile memory (such as RAM), non-volatile memory (such as ROM, flash memory, etc.) or any combination thereof. System memory 120 typically includes an operating system 121, one or more applications 122, and program data 124. Application 122 may include an image processing algorithm 123 that is arranged to process original image data. Program data 124 may include data 125 that defines certain variable parameters (e.g., user-defined parameters), and/or certain rules, algorithms, and/or compression ratios for processing image data.

Referring again to FIG. 1, computing device 120 can have additional features or functionality, and additional interfaces to facilitate communications between the basic configuration 101 and any required devices and interfaces. For example, a bus/interface controller 140 can be used to facilitate communications between the basic configuration 101 and one or more data storage devices 150 via a storage interface bus 141. The data storage devices 150 can be removable storage devices 151, non-removable storage devices 152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 120, removable storage 151 and non-removable storage 152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 120. Any such computer storage media can be part of device 120.

Computing device 120 can also include an interface bus 142 for facilitating communication from various interface devices (e.g., output interfaces, peripheral interfaces, and communication interfaces) to the basic configuration 101 via the bus/interface controller 140. Example output devices 160 include a graphics processing unit 161 which may be configured to communicate to the display device 130, and an audio processing unit 162 which may be configured to communicate to speakers, via one or more A/V ports 163. Example peripheral interfaces 170 include a serial interface controller 171 or a parallel interface controller 172, which can be configured to communicate with external devices such as input devices (e.g., keyboard, mouse, pen, voice input device, touch input device, etc.) or other peripheral devices (e.g., printer, scanner, etc.) via one or more I/O ports 173. An example communication device 180 includes a network controller 181, which can be arranged to facilitate communications with one or more other computing devices 190 over a network communication via one or more communication ports 182. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 can also be implemented as a personal computer including both laptop computer and non-laptop computer configurations.

Figure 2:
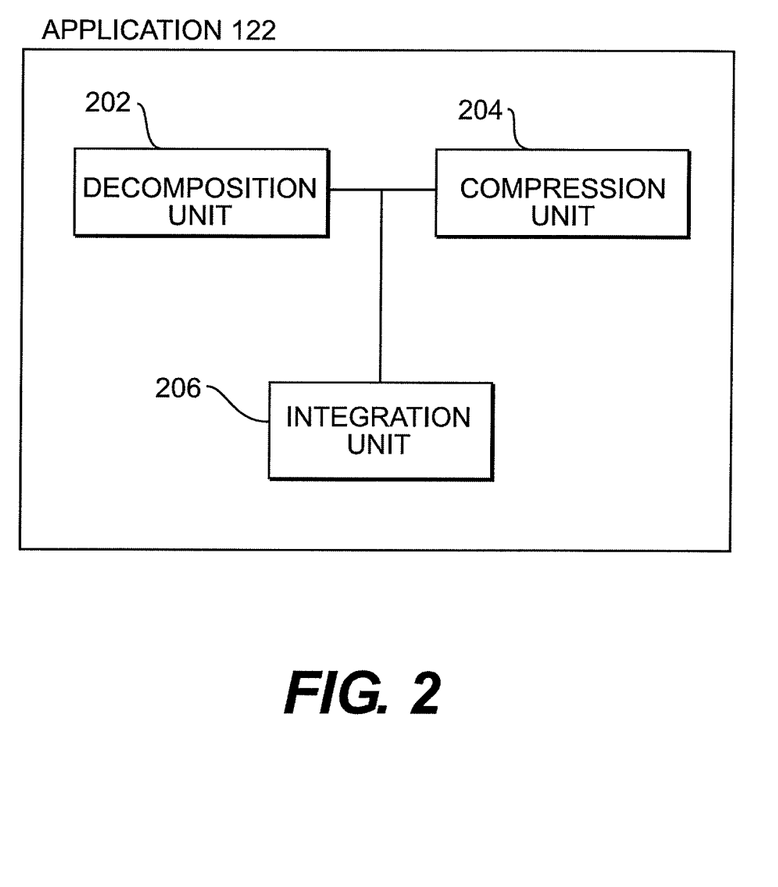
FIG. 2 is a block diagram illustrating an example of a configuration of an application within a computing device arranged to process images, according to an example embodiment.

FIG. 2 is a block diagram block diagram illustrating an example of a configuration of an application within a computing device arranged to process images, according to an example embodiment. Application 122 may include decomposition unit 202, compression unit 204 and integration unit 206.

Decomposition unit 202 may receive original image data for processing. Decomposition unit 202 decomposes two-dimensional images by performing EMD, such as a HTT. EMD is based on the following assumption about an input signal: 1) The signal has at least two extrema, i.e. one maximum and one minimum; 2) The characteristic magnitude of signal is determined by the displacement between two successive extrema; 3) The signal may be differentiated to regain extrema in case the original signal has no extremum, and when the decomposition is complete, the results may be integrated to recover corresponding results of the original signal.

In order to decompose the original two-dimensional signal, let the original image be denoted as I(x,y), with x and y representing two dimension respectively.

1) Find out all maxima $I^i{}_M(x,y)$ and minima $I^i{}_m(x,y)$ of $I(x,y)$;

2) Interpolate among both $I^i{}_M(x,y)$ and $I^i{}_m(x,y)$ to obtain two envelope surfaces, one containing all maxima as the upper envelope surface and the other containing all minima as the lower envelope surface. Their average is then calculated to obtain a mean surface $I^1{}_{mean}(x,y)$; the interpolation method chosen affects the outcome of decomposition.

3) Let $I^1{}_h(x,y)=I(x,y)-I^1{}_{mean}(x,y)$ and repeat step 1 and 2 with $I^1{}_h(x,y)$ as input image. The corresponding mean surface of $I^1{}_h(x,y)$ is denoted as $I^{1l}{}_{mean}(x,y)$ and then let $I^{1l}{}_h(x,y)=I^1{}_h(x,y)-I^{1l}{}_{mean}(x,y)$ 4) Repeat the above three steps for k times and get $I^{1k}{}_h(x,y)=I^{1(k-1)}{}_h(x,y)-I^{1k}{}_{mean}(x,y)$. Let $I^1{}_c(x,y)=I^{1k}{}_h(x,y)$ be $IMF_1$. Here the value of k may be determined by calculating the standard deviation between $I^{1k}{}_h(x,y)$ and $I^{1(k-1)}{}_h(x,y)$, i.e. let $$SD = \sum_{(x,y)} \frac{\left[|I_h^{1(k-1)}(x,y) - I_h^{1(k)}(x,y)|^2\right]}{I_h^{1(k-1)}(x,y)^2}$$

and stop the iterative steps when SD reaches certain, a predetermined stopping condition. For example, a predetermined stopping condition may be when SD reaches a reset value.

Let $I^1{}_r(x,y)=X(t)-I^1{}_c(x,y)$, and repeat the above four steps with $I^1{}_r(x,y)$ as input image to get $IMF_2$; $IMF_i$ may be obtained by repeating above process. The process may stop after obtaining $IMF_2$. $IMF_1$-$IMF_i$ are the layers that may be separately processed.

Application 122 further includes compression unit 204. Compression unit 204 accesses or receives the decomposed layers that were decomposed by decomposition unit 202. Compression unit 204 performs compression on each of the layers determined by the decomposition unit 202. Compression may be performed on the intensity dynamic range of each layer. It may be appreciated by one skilled in the art that various compression algorithms may be applied, for example, a linear compression; non-linear, for example, logarithmic and/or polynomial compression; etc. The selected compression algorithm may be applied to one or more layers. It may be appreciated that other compression algorithms may be applied. The selection of the algorithm may depend on one or more factors, for example, speed of the algorithm effect of the algorithm, etc. When the input image is decomposed into two layers, i.e. the steps 2-4 are carried out once with i=1, the first layer to be compressed is $IMF_1.(x,y)$, which may be featured by large amplitude and low frequency in terms of intensity, and the second layer to be compressed is $IMF_2(x,y)$, which may be featured by small amplitude and high frequency in terms of intensity. The dynamic range of intensity of these two layers can be compressed severally with different compression ratios.

The compression ratios may be selected based on various criteria. For example, the compression ratios may be selected from a plurality of compression ratios based on a display characteristic, for example, a dynamic range capability of a display device. Alternatively, the compression ratios may be selected from a plurality of compression ratios by a user. The ratios may be applied as long as the final image satisfies any existing requirements for the final image, for example, the dynamic range requirement of certain displaying device, such as a liquid crystal display.

Application 122 further includes integration unit 206. Integration unit 206 accesses or receives all of the dynamic-range-compressed layers that were compressed by compression unit 204. Integration unit 206 integrates all of the dynamic-range-compressed layers. The integration unit 206 may integrate all of these layers by using, for example, a reverse EMD/HHT process. The final image obtained from the integration may have a lower intensity dynamic range than the original image. The number of details in the final image may be controlled by applying different compression ratios when the dynamic range of each layer is compressed in the compression unit 204.

For example, dynamic range of a layer with large intensity amplitude can be compressed by a large compression ratio, and dynamic range of a layer with small intensity amplitude can be compressed by a small compression ratio. The applied compression ratio may be directly proportional with the intensity amplitude of a layer, wherein the details embedded in the layer with small intensity amplitude can be retained.

Figure 3:
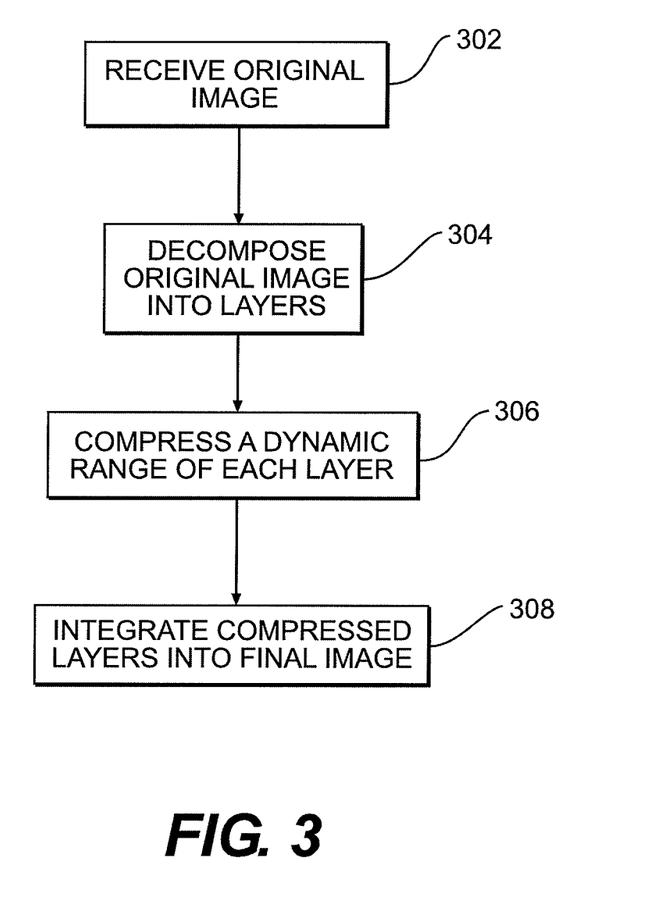
FIG. 3 is a flow diagram illustrating a method for processing images, according to an example embodiment.

FIG. 3 illustrates a flow diagram of the method for processing image data performed by the computing device, according to an example embodiment. As shown in step S302, computing device 100 receives original image data. The original image data may be obtained from one of storage devices 150, received from an external device, for example, an image capturing device, etc.

As shown in step S304, the original image data may be decomposed by decomposition unit 202 into a plurality of layers by the decomposition unit 202. The number of layers may be predetermined, may be selected by a user, etc.

As shown in step 306, each of the layers may be compressed by compression unit 204 by a compression ratio. The compression ratios may be predetermined, selected from a plurality of pre-stored compression ratios by a user, received at the computing device from a user, etc.

As shown in step 308, the compressed layers may be integrated by integration unit 206 into a final image, wherein the final image has a lower dynamic range than the original image.

Figure 4:
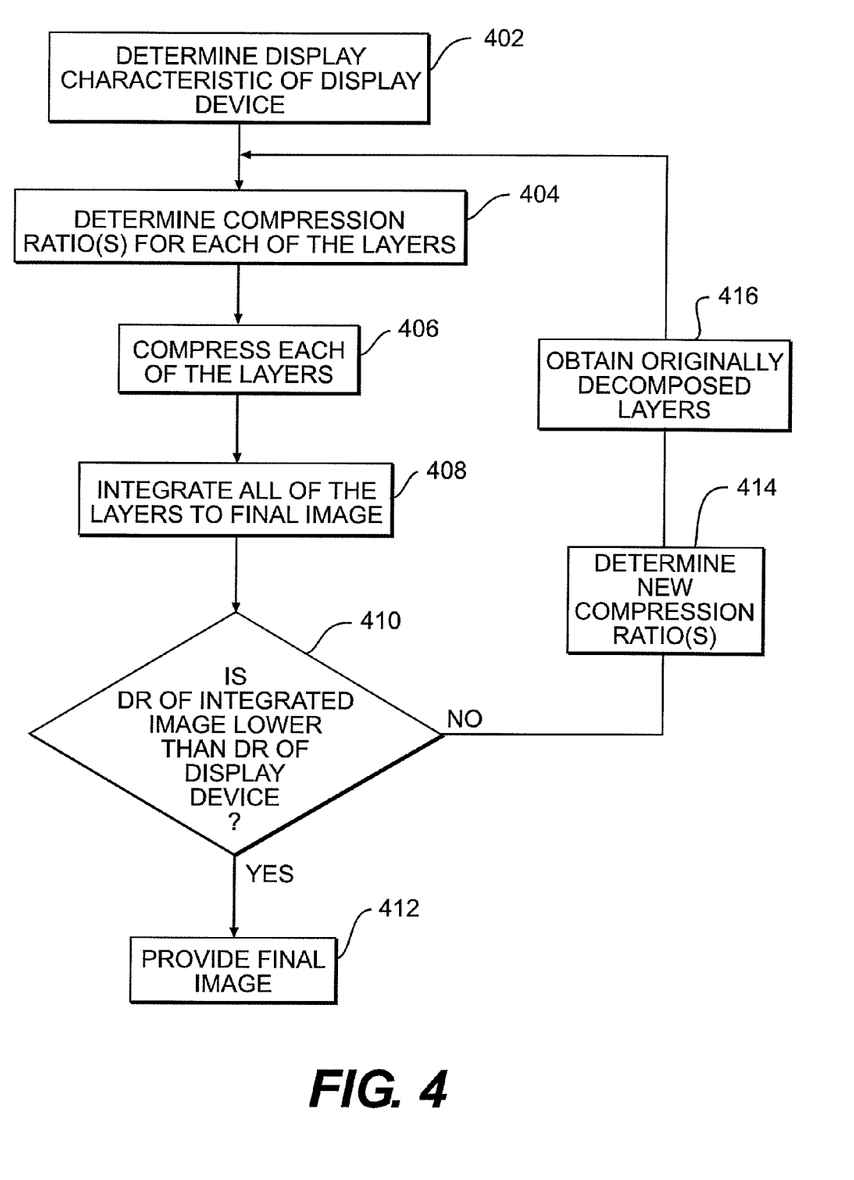
FIG. 4 is a flow diagram of a method for determining whether compression ratios result in final image having a lower dynamic ratio than a display device, according an example embodiment.

FIG. 4 depicts a flow diagram illustrating the method for determining whether the compression algorithm(s) applied to each of the layers were sufficient for display on a display device. As shown in FIG. 4, a display characteristic of the display device that will be used to display a final image may be determined (S402). This display characteristic may be the dynamic range of the display device. Compression unit 204 then determines the compression ratio(s) that will be applied to the decomposed layers decomposed by the decomposition unit 202 (S404). Compression unit 204 then compresses each of the layers by applying the determined ratio(s) to the respective layers (S406). It may be appreciated that the different compression ratios may be applied to each of the layers. Alternatively, the same compression ratio may be applied to one or more layers. Alternatively, no compression ratio may be applied to one or more layers.

All of the layers are integrated to form a final image (S408). The dynamic range of the integrated image may be determined and compared with the display characteristic, i.e., the dynamic range, of the display device (S410). If the dynamic range of the final image is lower than the dynamic range of the display device (S410, Yes), then the final image may be provided (S412). The final image may be provided to the display device, may be stored in one of storage devices 150, may be output to another computing device through communication device 180, etc.

If the dynamic range of the final image is higher than the dynamic range of the display device, (S410, No), then the compression unit 204 determines new compression ratio(s) to be applied to each of the layers (S414). The originally decomposed layers are accessed (S416) and processing returns to S404 for further processing with the new compression ratios. Alternatively, the layers compressed in step S406 may be accessed and processed with the compression ratios determined in S414 and S416 may be omitted.

It may be appreciated that the process depicted in FIG. 4 may be repeated until the dynamic range of the integrated image is lower than the dynamic range of the display device.

Figure 5:
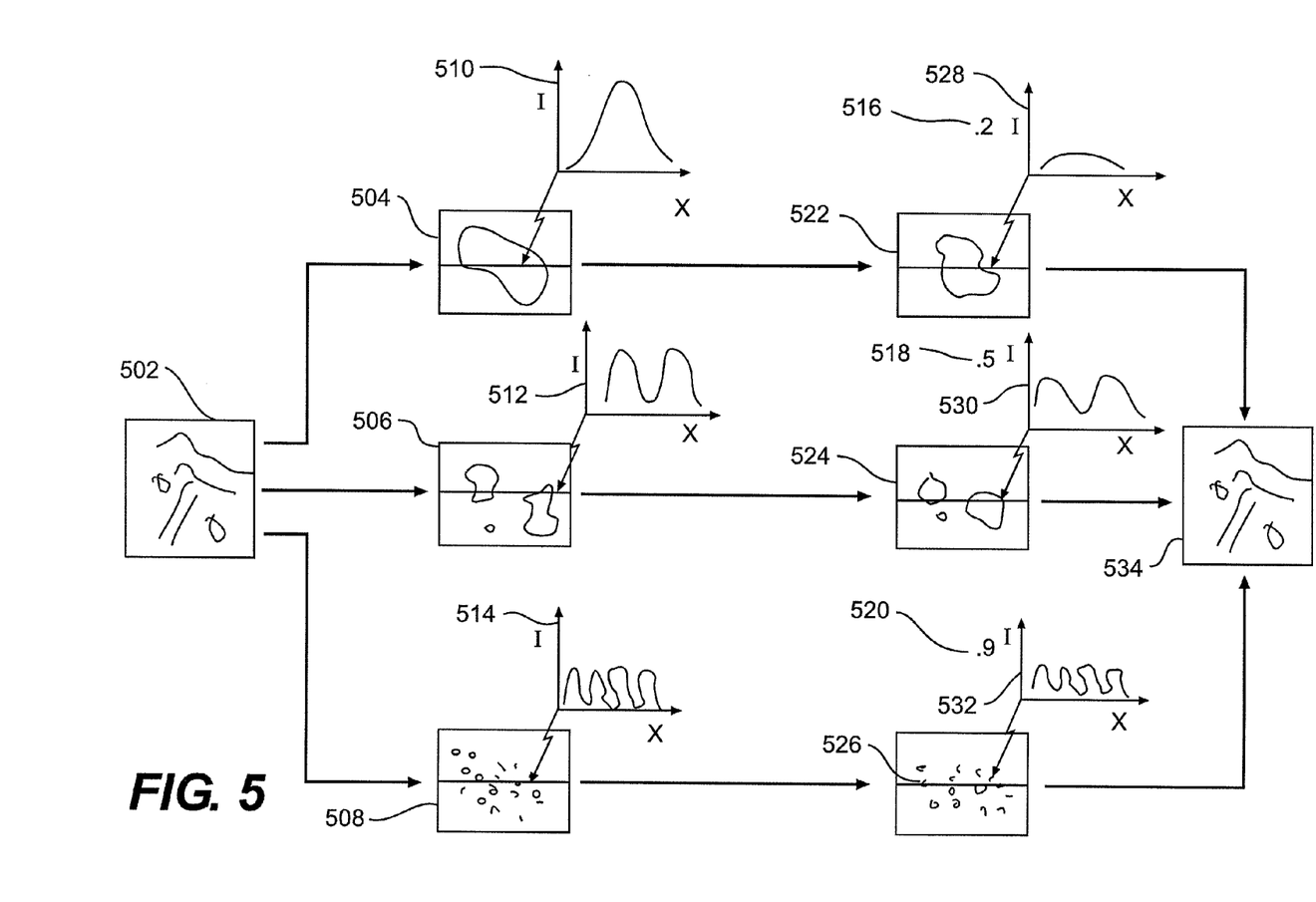
FIG. 5 is a diagram illustrating an example of image processing according to an example embodiment.

FIG. 5 depicts an example of image processing according to an example embodiment. As shown in FIG. 5, original high dynamic range image 502 may be provided at computing device 100. The original image may be provided to decomposition unit 202 at application 122 for decomposition. In this example, the original image is decomposed into three layers, 504, 506 and 508 by applying an EMD/HTT transform discussed above.

Graph 510 depicts a slice in the image representing the intensity with respect to horizontal position in layer 504. Graph 512 depicts a slice in the image representing the intensity with respect to horizontal position in layer 506. Graph 514 depicts a slice in the image representing the intensity with respect to horizontal position in layer 508.

Compression unit 204 determines compression ratios 516, 518 and 520 that are to be applied to each of the layers. The compression ratios are then applied to the respective layers to form compressed layers 522, 524 and 526. Graph 528 depicts a slice in the image representing the intensity with respect to horizontal position in compressed layer 522. Graph 530 depicts a slice in the image representing the intensity with respect to horizontal position in compressed layer 524. Graph 532 depicts a slice in the image representing the intensity with respect to horizontal position in compressed layer 526. As can be seen by graphs 528, 530 and 532, the intensity is lower after the compression ratios are applied.

Integration unit 206 then integrates all of the layers using the reverse EMD/HTT transform to for final image 534.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    receiving original image data;
    decomposing, using an empirical mode decomposition (EMD) transform, the original image data into a plurality of layers by decomposing a signal, which represents the original image data, into basis functions that are adapted from the signal;
    compressing a dynamic range of each of the plurality of layers, wherein the compressing for a respective layer of the plurality of layers is performed using a compression ratio that is directly proportional with an intensity amplitude of the respective layer, wherein details of the respective layer with a small intensity amplitude can be retained; and
    integrating, using a reverse EMD transform, the plurality of compressed layers to form a final image.

2. The method of claim 1, wherein each of the plurality of layers encodes information of different frequency ranges of intensity.

3. The method of claim 2, wherein the compressing the dynamic range includes compressing an intensity dynamic range of each of the plurality of layers.

4. The method of claim 2, wherein the compressing the dynamic range further comprises:
    determining the dynamic range of a display device; and
    compressing the dynamic range of each of the plurality of layers wherein the final image has a dynamic range within the dynamic range of the display device.

5. The method of claim 1, wherein the EMD transform includes a Hilbert Huang Transform.

6. The method of claim 1, wherein at least one of the plurality of layers is compressed with a different compression ratio than another of the plurality of layers.

7. An apparatus for high dynamic range mapping of image data comprising:
    a receiver configured to receive original image data;
    a decomposition unit configured to decompose the original image data into a plurality of layers using an empirical mode decomposition (EMD) transform;
    a compression unit configured to compress a dynamic range of each of the plurality of layers, wherein the compression unit compresses a respective layer of the plurality of layers using a compression ratio that is directly proportional with an intensity amplitude of the respective layer, wherein details of the respective layer with a small intensity amplitude can be retained; and
    an integrating unit configured to integrate the plurality of compressed layers to form a final image using a reverse EMD transform.

8. The apparatus of claim 7, wherein each of the plurality of layers encodes information of different frequency ranges of intensity.

9. The apparatus of claim 8, wherein the compression unit compresses an intensity dynamic range of each of the plurality of layers.

10. The apparatus of claim 8, wherein the compression unit is further configured to:
    determine the dynamic range of a display device; and
    compress the dynamic range of each of the plurality of layers wherein the final image has a dynamic range within the dynamic range of the display device.

11. The apparatus of claim 7, wherein the EMD transform includes a Hilbert Huang Transform.

12. The apparatus of claim 7, wherein at least one of the plurality of layers is compressed with a different compression ratio than another of the plurality of layers.

13. The apparatus of claim 7, wherein the decomposition unit decomposes the original image data into a plurality of layers by decomposing a signal representing the original image data into basis functions that are adapted from the signal.

14. A non-transitory computer-readable medium, storing a set of instructions, executed by a processor, to perform a method comprising:
- receiving original image data;
- decomposing the original image data into a plurality of layers using an empirical model decomposition (EMD) transform;
- compressing a dynamic range of each of the plurality of layers, wherein the compressing for a respective layer of the plurality of layers is performed using a compression ratio that is directly proportional with an intensity amplitude of the respective layer, wherein details of the respective layer with a small intensity amplitude can be retained; and
- integrating the plurality of compressed layers to form a final image using a reverse EMD transform.

15. The non-transitory computer-readable medium of claim 14, wherein each of the plurality of layers encodes information of different frequency ranges of intensity.

16. The non-transitory computer-readable medium of claim 15, wherein the compressing the dynamic range compresses an intensity dynamic range of each of the plurality of layers.

17. The non-transitory computer-readable medium of claim 15, wherein compressing the dynamic range further comprises:
- determining the dynamic range of a display device; and
- compressing the dynamic range of each of the plurality of layers wherein the final image has a dynamic range within the dynamic range of the display device.

18. The non-transitory computer-readable medium of claim 14, wherein the EMD transform includes a Hilbert Huang Transform.

19. The non-transitory computer-readable medium of claim 14, wherein at least one of the plurality of layers is compressed with a different compression ratio than another of the plurality of layers.

20. The non-transitory computer-readable medium of claim 14, wherein the decomposing the original image data includes decomposing a signal representing the original image data into basis functions that are adapted from the signal.

* * * * *

UNITED STATES PATENT AND TRADEMARK OFFICE
CERTIFICATE OF CORRECTION

PATENT NO.       : 8,515,167 B2
APPLICATION NO.  : 12/551093
DATED            : August 20, 2013
INVENTOR(S)      : Yuan et al.

It is certified that error appears in the above-identified patent and that said Letters Patent is hereby corrected as shown below:

In the Drawings

In Fig. 1, Sheet 1 of 5, in Box "110", in Line 1, delete "UP/UC/DSP" and insert -- µP/µC/DSP --, therefor.

In Fig. 1, Sheet 1 of 5, delete "  " and insert  --, therefor.

In the Specification

In Column 1, Line 41, delete "signal itself" and insert -- signal itself. --, therefor.

In Column 2, Line 56, delete "HTT (EMD/HTT)," and insert -- HHT (EMD/HHT), --, therefor.

In Column 2, Line 61, delete "HTT." and insert -- HHT. --, therefor.

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,515,167 B2

In Column 3, Line 14, delete "computing device 120" and insert -- computing device 100 --, therefor.

In Column 3, Line 43, delete "computing device 120" and insert -- computing device 100 --, therefor.

In Column 4, Line 3, delete "computing device 120." and insert -- computing device 100. --, therefor.

In Column 4, Line 5, delete "Computing device 120" and insert -- Computing device 100 --, therefor.

In Column 4, Line 11, delete "display device 130," and insert -- display device, --, therefor.

In Column 4, Line 56, delete "HTT." and insert -- HHT. --, therefor.

In Column 5, Line 2, delete "I(x,y);" and insert -- I(x,y). --, therefor.

In Column 5, Line 11, delete "$I^{11}_{mean}(x,y)$" and insert -- $I^{11}_{mean}(x,y)$, --, therefor.

In Column 5, Line 12, delete "$I^{11}_{mean}(x,y)$" and insert -- $I^{11}_{mean}(x,y)$. --, therefor.

In Column 5, Line 29, delete "$IMF_2$.; $IMF_i$." and insert -- $IMF_2$; $IMF_i$ --, therefor.

In Column 5, Line 31, delete "$IMF1-IMF_i$" and insert -- $IMF_1-IMF_i$ --, therefor.

In Column 7, Line 15, delete "EMD/HTT" and insert -- EMD/HHT --, therefor.

In Column 7, Line 36, delete "EMD/HTT" and insert -- EMD/HHT --, therefor.